July 15, 1947.　　　O. J. POUPITCH　　　2,424,208
LOCKING DEVICE
Filed Aug. 28, 1944　　　2 Sheets-Sheet 1
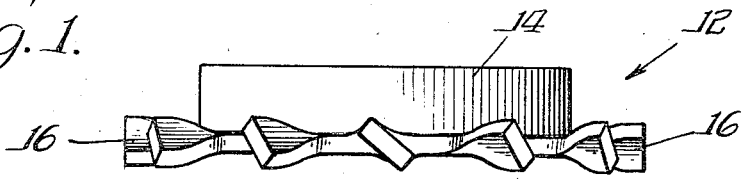
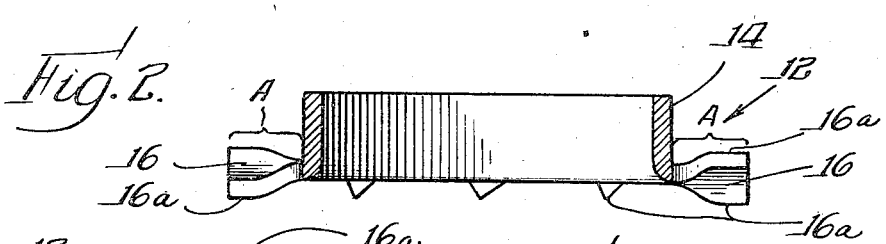
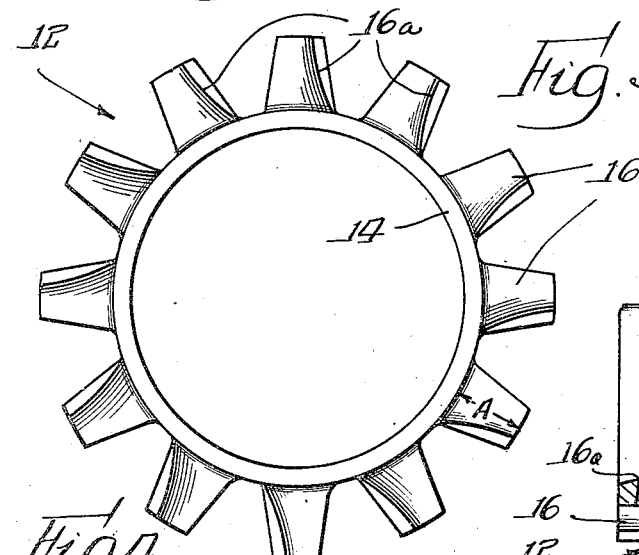
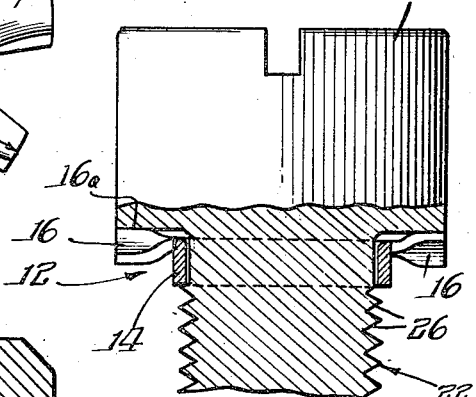
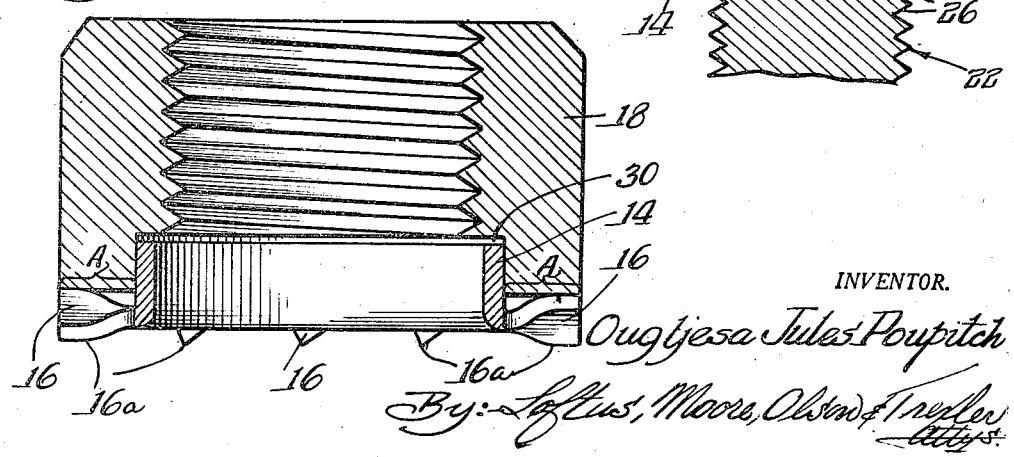
INVENTOR.
Ougljesa Jules Poupitch
By: Loftus, Moore, Olson & Trexler
Attys.

July 15, 1947.   O. J. POUPITCH   2,424,208
LOCKING DEVICE
Filed Aug. 28, 1944   2 Sheets-Sheet 2
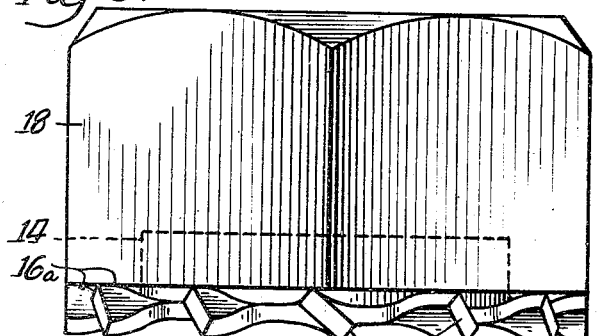
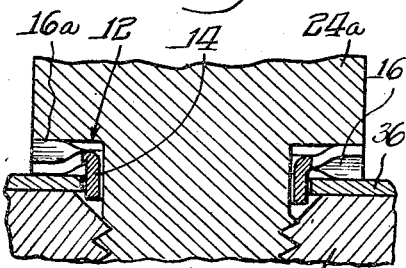
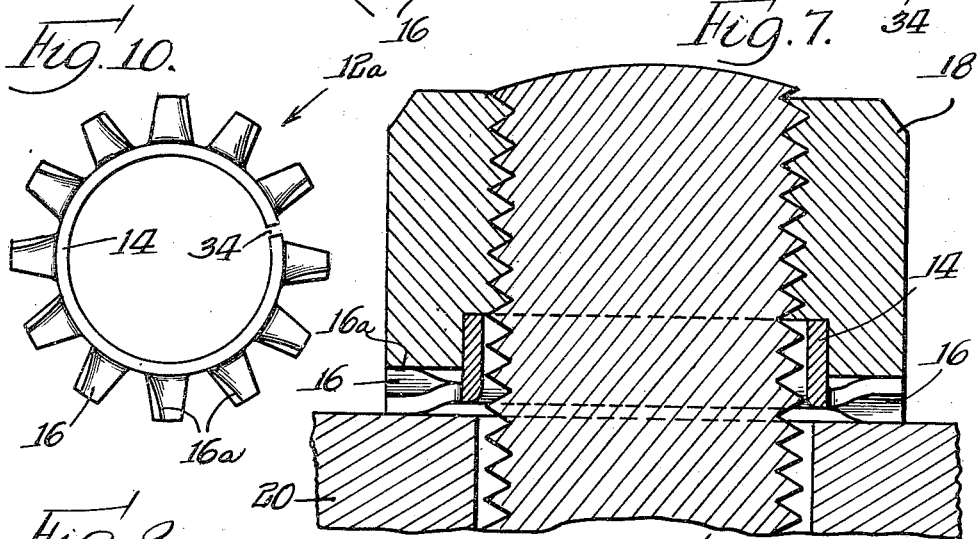
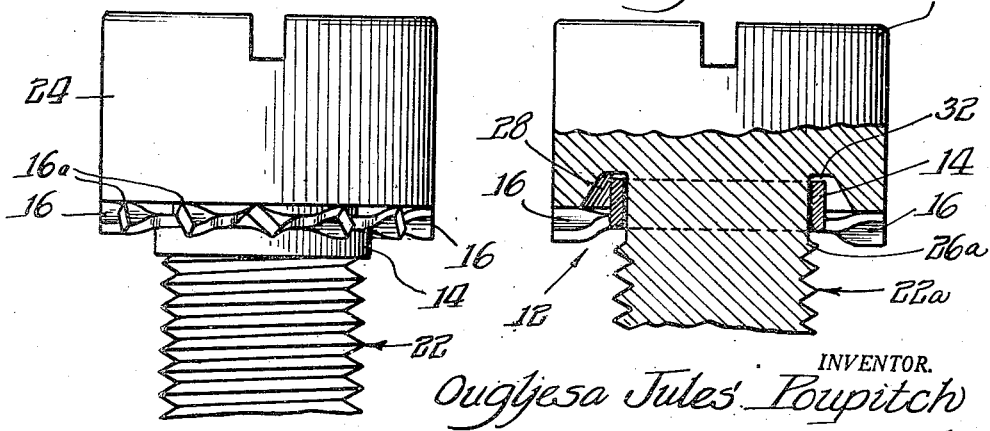
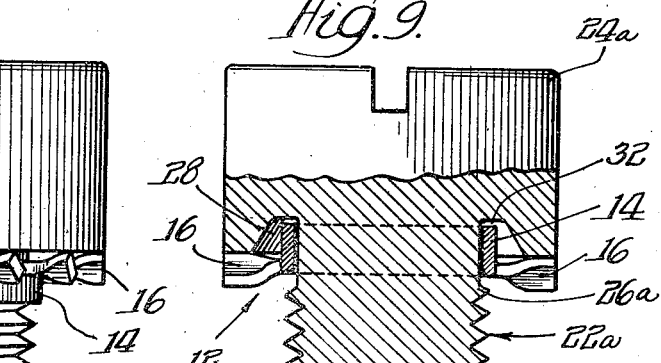
INVENTOR.
Ougljesa Jules Poupitch
By: Loftus, Moore, Olson & Trexler
attys.

Patented July 15, 1947

2,424,208

UNITED STATES PATENT OFFICE 2,424,208

LOCKING DEVICE

Ougljesa Jules Poupitch, Chicago, Ill., assignor to Illinois Tool Works, Chicago, Ill., a corporation to Illinois Application August 28, 1944, Serial No. 551,460

7 Claims. (Cl. 151—35)

The present invention relates generally to locking devices for screws and nuts, and more particularly to lock washers adapted to be used with nuts and screw heads having relatively narrow clamping surfaces.

It is well known that certain types of nuts and certain types of screw heads present a relatively narrow, annular clamping surface to the work. For example, nuts constructed in accordance with S. A. E. standards have a clamping surface and consequently an external diameter which is considerably smaller than the clamping surface and external diameter of the conventional nut. Likewise certain screw heads, such as filister head screws, are also relatively small in external diameter and consequently have relatively narrow annular clamping surfaces. The present invention is concerned with the problem of supplying lock washers, particularly designed to meet the aforesaid dimensional requirements. It has been found difficult, for example, to obtain the desired locking efficiency by using available external tooth or pronged lock washers beneath the relatively narrow clamping surfaces of S. A. E. nuts. This has been due to the fact that the annular body portion which is usually positioned in a plane coincident with the plane of the washer teeth, requires a considerable radial area, and hence the external teeth of the washer project a considerable distance beyond the external limits of the clamping surface. To avoid this difficulty, lock washers with internal locking teeth have been employed. However, in order to maintain maximum locking efficiency it is desirable to have the teeth of the lock washers bite into the clamping surface of the nut in the vicinity of the outer margin thereof. External teeth in a lock washer are designed to engage the clamping surface in the vicinity of its outer margin, but in instances where the clamping surface is relatively narrow it has not been found practical to employ external tooth washers because the outer extremities of the washer teeth do not lockingly engage the clamping surface of the nut. In other words, the external diameter of the lock washer exceeds by a considerable amount the external diameter of the nut. If the radial width of a conventional externally toothed lock washer is reduced the strength of the lock washer is seriously impaired. Hence in order to obtain maximum locking efficiency not only must the locking teeth be properly presented to the clamping surface, but the annular body supporting said teeth must be of sufficient size to withstand the stresses to which the teeth are subjected. It is an object of the present invention to overcome the aforesaid and other structural and functional deficiencies by providing a lock washer having a maximum body strength and maximum tooth engagement with minimum overall or external lock washer diameter. To this end the invention contemplates the provision of a body portion, the entire portion of which extends normal to the plane of the external lock washer teeth.

More specifically, the invention contemplates a lock washer as set forth above, wherein locking teeth extend radially outward from one extremity of an annular, axially extending body, so that the entire outer or radially extending area of the washer stock is employed for the locking teeth and the entire axially extending annular portion is employed for body strength. In this manner the external diameter of the lock washer is maintained at a minimum without sacrificing radial extent of the washer teeth, and without impairing the strength of the washer body.

It is a further object of the present invention to provide fastener devices in which a lock washer of the type referred to above forms the locking structure and a nut having a relatively narrow clamping surface forms the other structure, the lock washer being preferably held as a unit by frictional engagement of the axial body portion with a complementary wall portion at the clamping side of the nut.

It is a further object of the present invention to provide a fastener device wherein the lock washer as specified above is used in association with the clamping side of a screw head having a relatively narrow clamping surface, such for example as the clamping surface of a filister head screw, the lock washer being preferably secured as a unit adjacent the clamping surface of the screw head.

The foregoing and other objects and advantages will be more apparent from the following detailed description when considered in connection with the accompanying drawings, wherein:

Figure 1 is a side elevational view of a lock washer constructed in accordance with the teachings of the present invention;

Figure 2 is a vertical sectional view taken centrally of the lock washer shown in Figure 1;

Figure 3 is a plan view of the lock washer shown in Figures 1 and 2;

Figure 4 is a sectional view of the lock washer as shown in Figure 2, the lock washer being disclosed in operative association with a nut having a relatively narrow clamping surface;

Figure 5 discloses the lock washer of Figures 1 to 3 inclusive, in operative association with the relatively narrow clamping surface of a filister head screw;

Figure 6 is a side elevational view of the combined lock washer and nut shown in Figure 4;

Figure 7 is a vertical central sectional view, similar to Figure 4, disclosing the combined lock washer and nut clamped against a work piece;

Figure 8 is a side elevational view of the combined filister head screw and lock washer shown in Figure 5;

Figure 9 discloses the manner in which the lock washer of the present invention may be combined with a filister head screw in which an annular recess or depression at the clamping side of the screw head is provided to accommodate the axially extending body portion of the lock washer;

Figure 10 is a plan view of a lock washer similar to the lock washer shown in Figures 1 to 3 inclusive, which is designed to be sprung into the cavity on the clamping side of a nut; and Figure 11 is a fragmentary sectional view, similar to Figure 5, disclosing the manner in which the axial body portion of the lock washer serves as a strengthening bushing to reinforce stock in the vicinity of a hole in the work piece against sheer stresses.

Referring now to the drawings more in detail, wherein like numerals have been employed to designate similar parts throughout the various figures, it will be seen that the present invention contemplates a lock washer designated generally by the numeral 12, Figures 1 to 3 inclusive. The lock washer 12 includes an annular, axially extending body portion 14. It will be noted that this body portion 14 is in the nature of a cylindrical flange extending laterally of a plurality of radial locking prongs or teeth 16. By having the entire body section or portion 14 formed cylindrical, or in other words extending laterally with respect to the washer teeth, the entire outer radial portion indicated by the bracket A, Figure 2, is employed for locking purposes.

It will be noted that the radial portion A is of sufficient radial extent to permit the formation of the circumferentially spaced, radially extending locking teeth 16. In the disclosed embodiment these teeth or prongs have their bases next adjacent the lower margin of the axial body 14, Figures 2 and 3. No part of the radial portion A is employed for the washer body and each tooth is twisted from its base to its outer extremity so as to provide a plurality of locking edges 16a. These edges 16a are designed to make a line bite with the clamping surface of a nut 18 on one side, and the surface of a work piece 20 on the opposite side, as clearly illustrated in Figure 7. It will be apparent that the axial disposition of the washer body not only enables the entire radial area A to be used for forming locking teeth but also makes it possible to hold to a minimum the external diameter of the lock washer taken across the teeth.

As illustrated in Figure 4, the aforesaid reduction in external diameter makes it possible to retain the entire locking section of the washer, namely the biting edges 16a, within the confines of the annular clamping surface of the nut without sacrificing body strength and without sacrificing radial extent of the washer prongs. The teeth or prongs 16, in order to afford maximum locking efficiency, must have sufficient radial length to permit twisting from their roots to their outer extremities without the potential hazard of fracture at the point where the prongs join with the body portion. In the disclosed embodiment the lock washer teeth or prongs are tapered, said teeth being wider at their roots than at their outer or free extremities. If sufficient radial length or extent is provided, these tapered teeth may be progressively twisted from the root to the free extremity so as to present biting edges on opposite sides of the medial plane of the prongs. The present invention provides radially extending stock of sufficient radial width to assure the proper twisting of the teeth from the root to the outer strutting extremity, and at the same time makes it possible to bring the entire group of locking or biting edges into operative association at all times with the relatively narrow clamping surface of the nut.

It will be apparent that by having a lock washer constructed as described, screw heads with relatively narrow clamping surfaces may be more efficiently locked by externally pronged washers. Furthermore the novel arrangement of the axial body and radial teeth extending from one margin thereof, avoids the unsightly appearance of lock washer teeth or prongs projecting beyond the external margin or periphery of a nut. There are many applications which have heretofore prohibited the use of externally pronged lock washers with nuts having relatively narrow clamping surfaces. The use of externally pronged lock washers in household appliances and the like which must be frequently cleaned or dusted has in many instances been prohibited because of the presence of the sharp, outwardly projecting washer teeth. The present invention provides a lock washer, the external teeth of which may be held within the confines of the nut periphery, thereby affording maximum locking effectiveness and freedom from exposed locking tooth extremities. There are instances also wherein nuts of the type contemplated hereby must be used in places which because of certain dimensional limitations will not permit the application of a lock washer projecting beyond the confines of the nut periphery.

Thus far, the lock washer of the present invention has been described as applied to nuts having relatively narrow clamping surfaces. The lock washer also has a very practical application to screws having heads of relatively narrow dimension, such, for example, as filister head screws. In Figure 5 the lock washer 12 is disclosed in operative association with a filister head screw designated generally by the numeral 22, Figures 5 and 8. The head 24 of the screw 22 has a relatively narrow clamping surface. In the disclosed embodiment the lock washer and screw are telescopically associated prior to the rolling of the thread convolutions 26 thereon. That is to say, the screw blank and lock washer are first telescopically associated and then the thread convolutions 26 are rolled upon the blank. This causes the external diameter of the threaded shank to be enlarged sufficiently to prevent the lock washer from being axially displaced. The combined screw 22 and lock washer 12 provide a fastener unit in which the teeth or prongs 16 are positioned to lock along the annular area determined by the clamping surface of the screw head 24. The external diameter of the lock washer being held to a minimum, as previously pointed out in connection with the nut 18, makes it possible to hold the washer teeth within the confines of the clamping surface of the filister head as illustrated in Figures 5 and 8. In addition, the axially extending body 14 of the lock washer provides sufficient increased axial dimension of the stock to positively prevent inadvertent unscrewing of the lock washer. Experience has shown that in certain instances lock washers of the external tooth type, having body portions lying in a plane normal to the axis, have a tendency to follow within the helical path of the screw thread, thereby causing the parts to become separated. This is due to the fact that in certain sizes of lock washers the stock is relatively thin as compared to the axial pitch of the screw thread. The axial body portion 14 provides sufficient axial thickness in this vicinity to positively preclude inadvertent separation of the two parts.

In Figure 9 a slightly modified fastener unit, employing a filister head screw 22a, is shown. This screw 22a has a head 24a which is provided with an annular recess 28 in the vicinity of the clamping surface thereof to accommodate the axial body portion 14 of the lock washer. The thread convolutions 26a of the screw, like the threaded convolutions 26 previously described, are rolled on the screw blank after initial telescopic association of the screw and washer. Thus the thread convolutions project sufficiently beyond the internal wall of the body portion 14 so as to secure the lock washer against displacement. By having the axial body portion 14 extend outwardly into the confines of the screw head, the thread convolutions 26a may be rolled closer to the clamping surface of the screw head than the thread convolutions 26. This proves to be advantageous in instances where little or no clearance is provided in the work piece against which the lock washer is clamped. When the structure shown in Figures 5 and 8 is employed, sufficient clearance in the work piece must be provided for the portion of the axial body extending laterally from one side of the lock washer. In Figure 9 this structural requirement is avoided.

Attention is directed to a slight clearance, indicated by the numeral 30 in Figure 4 and 32 of Figure 9, between the edge of the body portion 14 and the adjacent portion of the screw head. When the nut of Figure 4 is tightened against the work piece 20, as illustrated in Figure 7, the clearance 30 is taken up due to the slight untwisting of the lock washer teeth. By having direct bearing between the screw head and the inner edge of the axial body 14 after the nut has been tightened in place, further tendency for the lock washer teeth to untwist or become flattened is effectively counteracted. Likewise the clearance 32 is taken up during the initial tightening of the filister head 24a against a work piece.

In Figure 10 a slightly modified lock washer structure is shown. This lock washer is designated generally by the numeral 12a and is similar in every respect to the lock washer 12 except that the body 14 is severed at 34. The lock washer 12a must be slightly collapsed before association with the nut 18. After the axial body of the washer 12a has been positioned within the recess of the nut, the washer is released and the axial body thereof springs outwardly into frictional contact with the complementary wall of the nut. In this way the lock washer is held by spring pressure as a unit within the nut. In instances where this resilient retention of the lock washer within the nut is not required, the annularly continuous body portion 14, as shown in Figures 1 to 3 inclusive, may be forced into a frictional fit within the confines of the nut recess so as to present a preassembled nut and lock washer device. It will thus be apparent that the provision of the axial body portion facilitates preassembly of the nut and lock washer, both with respect to nuts and screws.

In Figure 11 the filister head screw and associated lock washer are shown in operative association with a work piece 34 and a sheet metal work piece 36. The work piece 34 is threaded, and the sheet metal work piece 36 is apertured to accommodate the screw 22. It will be noted that the cylindrical body portion or flange 14 of the lock washer 12 provides a reinforcement within the aperture of the sheet metal work piece 36. In this manner the axial body portion serves as a reinforcement against sheer stress.

Summarizing, the present invention provides a lock washer construction which is particularly adaptable for use with relatively narrow rotary clamping surfaces of threaded fasteners, such, for instance, as nuts and screws. By having the entire axial portion of the lock washer stock available for a body portion, the external diameter is reduced to a minimum without the slightest impairment of the locking effectiveness of the teeth. The invention has made it possible to provide preassembled nuts and externally toothed lock washers in which the teeth of the lock washer are maintained within the area defined by the clamping surface of the nut. Likewise, the invention has made possible the production of a screw and lock washer assembly wherein the clamping surface of the screw head is relatively narrow, the lock washer being so designed as to positively preclude inadvertent or unauthorized unscrewing of the parts. The lock washer of the present invention may be manufactured with the utmost of economy and by the practice of conventional stamping and forming methods.

Obviously the invention is not limited to the specific structural details disclosed herein, but is capable of other modifications and changes without departing from the spirit and scope of the appended claims.

I claim:

1. A lock washer including an internal axially extending, annular body portion, and a plurality of locking teeth extending radially outward from a peripheral margin of said body portion and axially outwardly beyond the plane of an end margin of said body portion, said body portion being cylindrical and extending laterally from the base of said washer teeth a sufficient axial distance to provide washer retention means for the clamping side of a rotary threaded fastener whereby to reduce to a minimum the external diameter of the lock washer without sacrificing locking effectiveness.

2. A lock washer including an internal annular, axially extending body portion, and a plurality of locking prongs extending radially outward from one margin of said body portion, each prong presenting locking edges positioned on opposite sides of the median plane of said prongs, one locking edge of each prong projecting outwardly beyond the plane of an end margin of the body portion, said annular body portion providing a substantially cylindrical flange extending laterally from the base of said washer teeth a sufficient axial distance to provide washer retention means for the clamping side of a rotary threaded fastener whereby to reduce to a minimum the outer diameter of the lock washer without sacrificing locking effectiveness.

3. A lock washer including an annular, axially extending internal body portion, said body portion being resiliently shiftable transversely of the washer axis to permit telescopic preassembly with a complementary threaded fastener, and a plurality of locking teeth extending radially outward from one margin of said body portion and axially outward beyond the plane of an end margin of said body portion, the body portion providing a flange extending laterally from the base of said washer teeth a sufficient axial distance to provide washer retention means for the clamping side of a rotary threaded fastener whereby to reduce to a minimum the outer diameter of the lock washer without sacrificing locking effectiveness.

4. A locking device including a substantially cylindrical, axially extending washer body, a plurality of locking teeth extending radially outward from one margin of said washer body, and a rotary threaded fastener associated as a unit therewith having an annular relatively narrow clamping surface, said locking teeth being positioned adjacent said clamping surface and extending radially of the fastener substantially from an inner margin of said surface to, but not beyond, the outer margin of said surface, and the washer body portion providing a flange extending laterally from the base of the washer teeth, said flange body in adjacent encircling relation in respect to the threaded fastener and having a sufficient axial length to provide washer retention means for the clamping side of said rotary threaded fastener whereby to reduce the outer diameter of the lock washer and thereby position the washer teeth in proper locking relation with respect to said relatively narrow clamping surface.

5. A locking device including an annular, cylindrical washer body, a plurality of locking teeth extending radially outward from a peripheral margin of said washer body and axially outwardly beyond the plane of an end margin of said body, and a rotary threaded fastener associated therewith as a unit having an annular relatively narrow clamping surface, said locking teeth being positioned adjacent said clamping surface and the washer body portion providing a flange extending laterally from the base of the washer teeth a sufficient axial distance to provide washer retention means for the clamping side of said rotary threaded fastener whereby to reduce the outer diameter of the lock washer and thereby position the washer teeth in proper locking relation with respect to said relatively narrow clamping surface.

6. A locking device including an annular, axially extending washer body, a plurality of locking teeth extending laterally outward from a peripheral margin of said body and axially outward from an end margin of said body, said body being of sufficient axial length to provide washer retention means, and a threaded fastener associated therewith as a unit having a relatively narrow annular clamping surface, said fastener having a recess extending axially inward from said clamping surface providing an annular axially extending wall to accommodate said axially extending washer body, the entire radially extending portion of the washer comprising the aforesaid radial locking teeth, said washer body being frictionally secured as a unit with said fastener.

7. A locking device including an annular, axially extending washer body, a plurality of locking prongs extending radially outward from the outer peripheral margin of said body and axially beyond the end margin of said body, and a screw member associated therewith as a unit comprising a threaded shank and a head at one extremity thereof presenting a relatively narrow annular clamping surface, said screw member having an unthreaded washer receiving portion adjacent said clamping surface, the diameter of said unthreaded portion and the internal diameter of said annular washer body being less than the external diameter of said threaded shank, said lock washer being secured in operative position adjacent said clamping surface, the washer body being disposed in adjacent encircling relation with respect to the unthreaded portion of the screw shank and extending axially of the screw member a sufficient distance to provide washer retention means with the washer prongs disposed in locking relation with respect to the clamping surface.

OUGLJESA JULES POUPITCH.

REFERENCES CITED

The following references are of record in the file of this patent:

UNITED STATES PATENTS

| Number | Name | Date |
|---|---|---|
| 2,225,654 | Olson (a) | Dec. 24, 1940 |
| 1,030,136 | Skelton | June 18, 1912 |
| 1,561,880 | Morrison | Nov. 17, 1925 |
| 1,643,384 | Klafke | Sept. 27, 1927 |
| 2,112,425 | Crowther | Apr. 5, 1938 |
| 1,924,695 | Olson (b) | Aug. 29, 1933 |
| 1,645,859 | Hosking | Oct. 18, 1927 |

FOREIGN PATENTS

| Number | Country | Date |
|---|---|---|
| 540,864 | Great Britain | Nov. 3, 1941 |
| 110,337 | Switzerland | Aug. 1, 1925 |